United States Patent

Werner et al.

[11] Patent Number: 5,356,945
[45] Date of Patent: Oct. 18, 1994

[54] REACTIVE POLYURETHANES

[75] Inventors: Joachim Werner, Dormagen; Ulrich Liman, Monheim; Walter Meckel, Neuss; Armin Zenner, Dormagen; Wolfgang Pätzold, Cologne, all of Fed. Rep. of Germany

[73] Assignee: Bayer Aktiengesellschaft, Leverkusen, Fed. Rep. of Germany

[21] Appl. No.: 77,003

[22] Filed: Jun. 15, 1993

[30] Foreign Application Priority Data

Jun. 22, 1992 [DE] Fed. Rep. of Germany ....... 4220419

[51] Int. Cl.$^5$ .............................................. C08G 18/00
[52] U.S. Cl. ..................... 521/159; 521/160; 521/161; 521/164; 521/167; 528/45
[58] Field of Search ............. 521/159, 160, 161, 164, 521/167, 170; 528/45

[56] References Cited

U.S. PATENT DOCUMENTS

| | | | |
|---|---|---|---|
| 3,819,586 | 5/1974 | Rudolph et al. | 260/77.5 TB |
| 4,044,171 | 8/1977 | Muller et al. | 427/27 |
| 4,150,211 | 4/1979 | Müller et al. | 528/45 |

FOREIGN PATENT DOCUMENTS

| | | |
|---|---|---|
| 2017354 | 11/1990 | Canada. |
| 1300280 | 7/1969 | Fed. Rep. of Germany. |
| 1488631 | 10/1977 | United Kingdom. |

OTHER PUBLICATIONS

R. Pfriender, Kunststoffe 76 (1986), 10, p. 960 et seq.
Dr. M. Wachsmann, Kunststoffberater, Oct. 1987, pp. 27-28 (English Translation Attached).

*Primary Examiner*—Maurice J. Welsh
*Attorney, Agent, or Firm*—Joseph C. Gil; N. Denise Brown

[57] ABSTRACT

The present invention relates to polyurethanes with softening temperatures above 80° C. which are NCO-free, which are reactive via masked isocyanates, which are essentially linear and extensively pre-lengthened, and their preparation. The polyurethanes can be used as powders which can be processed like thermoplastics and post-cured.

9 Claims, No Drawings

REACTIVE POLYURETHANES

BACKGROUND OF THE INVENTION

The present invention relates to polyurethanes with a softening temperature above 80° C. which are NCO-free, reactive via masked isocyanates, essentially linear and extensively pre-lengthened, their preparation and their use as powders which can be processed like a thermoplastic and post-cured.

Powders play an important part in many areas of plastic preparation and processing. Due to their fluidity, they are used, e.g., for the preparation of adhesives, coatings or thin films and sheeting.

The use of decorative plastic sheeting in the interiors of motor vehicles is known (R. Pfriender, Kunststoffe 76 (1986), 10, p. 960 et seq.). According to the prior art, PVC/ABS sheeting which is shaped by thermoforming is generally used and this is subsequently backed with foam. Polyurethane sheeting prepared from liquid systems may be processed by the IMC process ("In-Mold-Coating"). However, the production of parts is very expensive and has still barely been mastered (Dr. M. Wachsmann, Kunststoffberater, 10/1987, p. 27-28).

On the other hand the "powder-slush-molding" process permits the production of much more finely structured sheeting which can be undercut and is thus qualitatively more useful. Here, according to the prior art, PVC powder is used which is gelled by agitation in a heated mold at about 200° C. After cooling the mold, the sheeting can be removed.

The disadvantage of the PVC sheeting which is usually backed with PU foam ("PU" is used as an abbreviation for polyurethane), however, is the mutually negative effect of PVC sheeting and the foam backing upon each other. Catalysts or stabilizers may diffuse out of the PU foam into the PVC covering, and at the same time migration of, e.g., plasticizers occurs from the PVC into the PU foam.

From the point of view of recycling, combination systems made from the same type of plastic are desired. Thus, there is intense interest on the part of the automobile industry in uniform materials in which the above-mentioned negative effects between covering and foam backing do not occur and where there is the possibility of simpler recycling. The use of PU top sheeting which is backed with PU foam would therefore be desirable.

The possibility of subsequently granulating and milling thermoplastic polyurethanes (TPU), which are obtained from the melt by extrusion or strip processes, and finally obtaining PU powders is known (German Auslegeschrift 3,916,874). These powders may be processed into sheeting by sintering.

The use of thermoplastic PU systems permits sintering of the powder with the melt flowing to form a homogeneous covering. With pure thermoplastic (linear) systems, however, the phenomenon which occurs is that on sintering, the low viscosity TPU melt flows or drains away to vertical surfaces of the mold or to overheated places in the mold. This leads to variable thickness of the layer or even to holes in the sheeting. However, the processing of thermoplastics presupposes an initially largely linear system. Cross-linking which takes place during the processing procedure would, however, be disadvantageous due to the increase in viscosity which would occur (in the following "cross-linking" includes cross-linking in the sense of the formation of branched structures).

It is known that isocyanates may be reacted with mono-functional reactants ("capping agents") such as, e.g., oximes, caprolactam or phenol derivatives, to give thermoplastic adducts. By using these "capped isocyanates", systems may be obtained which are thermoplastic up to the cleavage temperature of the adduct and cross-linked above this temperature.

Furthermore, the use of uretdiones or polyisocyanates which contain uretdione groups in single-component PU reactive systems is known per se. The polyisocyanates which contain uretdione groups are obtained by the placing together ("dimerization") of two isocyanate groups in the presence of special catalysts. The uretdione groups split up at elevated temperature with the re-formation of two isocyanate groups which, e.g. in the presence of OH groups, react further to produce cross-links. This happens without the release of a "capping agent". See D. Dieterich in "Methoden der organischen Chemie" (Houben-Weyl), E 20, p. 1650ff, New York 1987.

When producing thermoplastic PU systems by conventional extrusion or strip processes in the melt, as is described, e.g., in German Auslegeschrift 3,916,874, sufficiently high temperatures must be used to keep the melt viscosity low. This may cause problems when producing the above-mentioned one component PU systems which contain capped isocyanates because the cleavage temperature may be achieved or exceeded and the system may become noticeably cross-linked during preparation.

The preparation of one component PU coating powders is well-known and is the prior art. These are prepared by extruding mixtures of polyester resins or acrylate copolymers which contain functional hydroxyl groups and masked isocyanates at between 80° and 130° C. and then finely milling them (see Becker/Braun, Kunststoff-Handbuch, vol. 7, "Polyurethane", Carl Hanser Verlag, Munich, Vienna, 1983; DE-A 2 707 656). In order to ensure the storage stability of coating powders and to prevent caking at temperatures up to 50° C., the glass transition range of the component which reacts with NCO groups, e.g. the polyester resin with functional OH groups, must be relatively high, e.g., well above 0° C. Polyesters which impart flexible properties can be used only in small amounts due to their low glass transition temperature.

In the case of coating powders, therefore, in principle no increase in molecular weight or cross-linking, and therefore no pre-lengthening, takes place during preparation. However, in coating powders the component which reacts with NCO groups is present in an essentially free state alongside the completely masked isocyanate component. Only during processing (fusion) does unmasking and cross-linking take place, with an increase in molecular weight and the formation of polyurethane.

Accordingly relatively long processing times are required, e.g., 10 to 30 minutes at 160° to 200° C. For an application such as the "slush-molding" process mentioned above, however, it would be an advantage if an already extensively pre-lengthened, but still thermoplastic polyurethane could be used as the powder. This might be modified by the cross-linking occurring during processing, leading to an increase in viscosity.

The object of the present invention was, thus, to obtain a reactive, extensively pre-lengthened polyurethane, which is processable to give a storage-stable, pourable powder and which is useable as a powder in the "slush-molding" process, by developing a method which does not involve the risk of premature cross-linkage under the conditions of preparation.

DESCRIPTION OF THE INVENTION

It has now been found that the above noted object can be achieved according to the invention by an essentially linear polyurethane with a softening temperature above 80° C. which is essentially NCO-free and which is reactive via masked isocyanate groups, characterized in that it is a reaction product prepared from I) one or more organic diisocyanates of which at least a proportion is symmetric, II) one or more essentially linear polyhydroxyl compounds having molecular weights of between 400 and 6000 and glass transition temperatures below 0° C., III) an organic compound having at least a proportion of masked NCO groups, IV) one or more diols having molecular weights of 60 to 600, preferably 1,4-butanediol, wherein the ratio of the molecular weight of components II) to the molecular weight of component IV) is at least 3:1, and V) optional auxiliary and supplementary substances such as pigments, stabilizers, and catalysts, wherein a) components I), II), III) and IV) are reacted in the molten or liquid form at a temperature below the unmasking temperature of the masked NCO groups, b) the amount of masked NCO groups relative to total number of masked and free NCO groups before reaction is between 1 and 20%, and c) the ratio of free NCO groups in components I) and III) to the groups which react with NCO groups in components II) and IV) is no more than 1.1:1, preferably no more than 1.05:1, and most preferably no more than 1:1.

Preferably, the organic compound III) should have no more than two free NCO groups per molecule.

The reaction may take place, in one embodiment of the invention, as a "one-shot process", with a mixture of components II) and IV) in the presence of component III) reacting with component I) in one step. In another embodiment of the invention, the reaction may proceed step-wise via a prepolymer process, wherein, for example, an NCO prepolymer is initially prepared from components I) and II). This prepolymer is then reacted with component IV) in the presence of component III).

Aromatic, aliphatic or cycloaliphatic diisocyanates or mixtures thereof may be used as organic diisocyanates (component I)). Compounds with more functional groups may be used in small amounts, but then the average functionality of about two must be ensured by the optional admixture of mono-functional reactants. It should also be noted that these diisocyanates are, in the case of the "one-shot" embodiment, liquid at the reaction temperature. In the case of the prepolymer variant, the NCO prepolymer used is liquid. The following specific diisocyanates may be used: toluylene diisocyanate (2,4- and 2,6-isomers and mixtures thereof); diphenylmethane diisocyanate (4,4'- and 2,4'-isomers and mixtures thereof); 1,4-phenylene diisocyanate; 1,5-naphthylene diisocyanate (less preferred due to its high melting point); hexamethylene-1,6-diisocyanate; xylylene diisocyanate; 1,12-dodecane diisocyanate; 4,4'-methylene-bis-cyclohexyl diisocyanate; 1,4-cyclohexylene diisocyanate and isophorone diisocyanate.

Aliphatic or cycloaliphatic diisocyanates such as 1,6-hexamethylene diisocyanate, 4,4'-methylene-bis-cyclohexyl diisocyanate and isophorone diisocyanate are preferred if products which do not discolor in the presence of light are required.

In order to achieve a softening range above 80° C., at least a proportion, preferably at least 30 mol % of the total isocyanate mixture (component I)), of symmetric diisocyanates with NCO groups of the same reactivity are used. Examples of such isocyanates include, e.g., 4,4'-diphenylmethane diisocyanate, hexamethylene-1,6-diisocyanate or 4,4'-methylene-bis-cyclohexyl diisocyanate. A higher proportion of symmetric diisocyanates is particularly advantageous when using polyhydroxyl compounds which are liquid or pasty at room temperature as component II).

Essentially linear polyhydroxyl compounds with average molecular weights of from 400 to 6000 are used as component II). These compounds preferably contain an average of two hydroxyl groups per molecule. They may be solid or liquid at room temperature, and generally have glass transition temperatures well below 0° C., in order to ensure that the glass transition temperature of the reactive polyurethane remains below room temperature. Useful linear polyhydroxyl compounds include, e.g., polyesters, polycarbonates, polyestercarbonates, polyethers, polyethercarbonates, polyacetals, polyacrylates, polybutadienes, polyesteramides or polythioethers with functional hydroxyl groups. Polyethers with both hydroxyl groups and amino groups (see U.S. Pat. No. 4,724,252 and German Auslegeschrift 3,713,858) may also be used. Those compounds are preferred which have on average two groups which react with NCO groups per molecule. Compounds with more functional groups may be used, but then the average functionality of about 2 must be ensured by the optional admixture of mono-functional reactants.

Suitable polyethers are e.g., those which are obtained by ring-opening polymerization of propylene oxide or ethylene oxide in the presence of one or more compounds with active hydrogen or by ring-opening polymerization of tetrahydrofuran.

If light-resistant products are required, then polyesters, polycarbonates or polyestercarbonates with glass transition temperatures below 0° C. are preferably used. Suitable polyester-polyols may be obtained e.g., by condensation of one or more dicarboxylic acids, their arthydrides or diesters with one or more glycols of low molecular weight. Acyclic aliphatic dicarboxylic acids, such as e.g., succinic acid, adipic acid, suberic acid are preferred. Although aromatic dicarboxylic acids such as e.g., phthalic acid, isophthalic acid or terephthalic acid or the corresponding partially or perhydrogenated versions may be used, care should be taken that the glass transition temperature of the polyol does not rise to above 0° C. Suitable glycols of low molecular weight include ethylene glycol, 1,2- or 1,3-propylene glycol, 1,4- or 2,3-butanediol, neopentyl glycol, 1,6-hexanediol, 1,8-octanediol, cyclohexanedimethanol, diethylene glycol or dipropylene glycol. Polyesters which are obtained by the polymerization of lactones such as e.g., ε-caprolactone, are also suitable. Suitable polycarbonates with aliphatic hydroxyl groups may be obtained, e.g., by reaction of the above mentioned low molecular weight glycols with diaryl carbonates or cyclic carbonates such as propylene carbonate.

Diols which have molecular weights of less than 600 are used as component IV). The glycols of low molecular weight which were mentioned in connection with aliphatic polyesters, for instance, are suitable. Amine compounds are also basically suitable, but due to the formation of very high-melting urea segments are less preferred. Preferred in the "one-shot" process are mixtures of the diols of high and low molecular weight which have been mentioned. Butanediol-1,4 is particularly preferred as component IV).

The position of the softening range may be affected by the proportion of glycols of low molecular weight, preferably 1,4-butanediol, as component IV). In general, a minimum proportion of 2 moles of diol of low molecular weight, preferably 1,4-butanediol, is used per 1 mole of high molecular weight polyhydroxyl compound, preferably polyesters or polycarbonates. As already described, a sufficiently high softening point is also ensured by the use of at least a proportion of a symmetric diisocyanate.

Component III) is prepared separately and is used, depending on the method of preparation (i.e., one-shot or prepolymer), in the presence of the other components to prepare the reactive polyurethane according to the invention. Component III) has a proportion of masked NCO groups. It may be a reaction product containing only masked NCO groups which are inert towards groups which react with NCO groups under the conditions of preparation of the reactive polyurethane. Alternatively, it may be a reaction product which is reactive towards groups which react with NCO groups, and therefore contains both free NCO groups and masked NCO groups, which preferably has on average no more than two reactive NCO groups, so that it may be incorporated into the reactive polyurethane without preliminary cross-linking. Finally, component III) may also be a mixture of two such reaction products.

Component III) may be obtained by reacting a polyisocyanate partially or completely with a masking agent or with a masking agent and another compound which reacts with NCO groups, e.g., a polyol. It should be noted that the reaction product obtained must be homogeneously miscible with components I) or II) (for a one-shot process) or with a prepolymer prepared as a precursor. Advantageously, it should be liquid or be capable of melting at the temperatures used according to the invention.

Suitable polyisocyanates for reacting with a masking agent and/or another compound which reacts with NCO groups include the diisocyanates noted above. However, it is advantageous to use polyisocyanates with higher functionalities. Thus, it is preferred to use the well-known, e.g., in the painting and coating industry, cross-linking isocyanates such as polymers of diphenylmethane diisocyanate, biurets, trimethylolpropane adducts or trimers (isocyanurates) of the above-mentioned diisocyanates.

To introduce a specific melting behavior and to increase compatibility with component I) or II) or a prepolymer, another compound which reacts with NCO groups may be reacted with the masked polyisocyanate when preparing Component III). In this case, the glycols of high molecular weight mentioned above are preferably used. The ratio of glycol to masking agent, if an isocyanate with several functional groups is used, has to be selected so that no premature cross-linking ("swelling") of component III) occurs.

Useful masking agents include, e.g., oximes (preferably butanonoxime), lactams (preferably ε-caprolactam), acetoacetates (preferably ethyl acetylacetate), malonates (preferably diethyl malonate) or substituted phenols. From the latter group, p-hydroxybenzoates (e.g. ethyl p-hydroxybenzoate) are particularly preferred since they have low cleavage temperatures (below 150° C.), the ester which is eliminated is not very volatile and it does not have an unpleasant odor.

Component III) in a preferred embodiment may be obtained by partially masking the trimer (isocyanurate) of 1,6-hexamethylene diisocyanate with a p-hydroxybenzoate and reacting the remaining NCO groups with a polyester which has functional hydroxyl groups, particularly preferably with a polyadipate with a melting temperature of not higher than 100° C.

In another embodiment of the present invention, either 1,3-bis-[isocyanate-organo]-2,4-dioxo-1,3-diazetidines or 3,5-bis-[isocyanate-organo]-2,4,6-trioxo-tetrahydro-1,3,5-oxadiazines, such as, e.g., the adduct of 2 moles of 1,6-hexamethylene diisocyanate and 1 mole of carbon dioxide, may be used.

In another preferred embodiment, a constituent of component III) is a polyisocyanate adduct which generates further NCO groups on heating, without releasing a "splitter". Here may preferably be mentioned the so-called isocyanate dimers or uretdiones which were mentioned above. Specifically useful are the dimers of toluylene diisocyanate, diphenylmethane diisocyanate, isophorone diisocyanate, 1,6-hexamethylene diisocyanate and mixtures thereof.

The isocyanates which contain uretdione groups may be used as such or mixed with other polyisocyanates when used as component III). They may be reacted with mono-functional compounds which react with NCO groups, such as e.g., alcohols, for instance, to reduce the number of functional groups from on average more than two free NCO groups in the molecule. They may be reacted with a mixture of a glycol of high molecular weight and, to set the functionality, a compound with a single group which reacts with NCO groups, either as such or mixed with other polyisocyanates. They may also be used either on their own or mixed with other polyisocyanates to prepare component III) when using masking agents, as described above.

If products which do not discolor under the effect of light are desired, uretdiones of aliphatic and cycloaliphatic diisocyanates are preferred. Thus in a preferred embodiment, the dimer of 1,6-hexamethylene diisocyanate which still contains small amounts of trimer (isocyanurate) is reacted with a mono-alcohol, preferably n-butanol or n-octanol, to set the functionality, so that on average approximately two NCO groups remain per molecule. The product is advantageously liquid at room temperature and may be used as component III).

Addition of component III) to the reactive polyurethane should not impair the initial thermoplasticity, when processing the material in the melt but should provide sufficiently effective cross-linking.

The proportion of component III) in the reactive polyurethane according to the invention is accordingly limited on the one hand by the requirement for sufficiently effective cross-linking, which provides an increase in viscosity during processing, e.g. as a powder, and on the other hand by the risk of over-cross-linking, which is manifested by the powder prepared from the reactive polyurethane according to the invention no longer melting and flowing well. Preferably, component III) is used in an amount such that the proportion of the maximum number of NCO groups produced by unmasking or splitting to the total number of free and masked NCO groups is about 1 to 20%, preferably at least 2%, particularly preferably 2 to 12%.

The total number of NCO groups (masked and unmasked) before reaction of the components should be about the same as the total number of groups in the reactive polyurethane according to the invention which react with NCO groups before reaction (excluding the groups which react with NCO groups optionally provided by the splitter). The NCO groups being unmasked during processing of the reactive polyurethane ideally react with some of the groups which react with NCO groups, which remain through addition of component II) (e.g., a polyester) and IV) (e.g., 1,4-butanediol) after reaction with component I) (e.g., a diisocyanate). Accordingly, the proportion of components II) and IV) has to be selected so that after reaction with the free NCO groups in component I) and optionally component III), an excess of groups which react with NCO groups remains, which corresponds approximately to the number of masked NCO groups in component III). The fusion behavior of the reactive polyurethanes and also post-curing can be influenced by an excess or deficit of masked NCO groups. Preferably, the separate components for the preparation of the reactive polyurethanes are coordinated in such a way that they preferentially melt in a range from 150° to 220° C. with cross-linking. It has been found that the processing temperature for the reactive polyurethanes may be lowered in an advantageous manner by a small excess of groups which react with isocyanates, e.g., OH groups, and thereby at the same time the initial viscosity of the melt may be set so that, e.g., a powder melt flows in the desired way during cross-linking to give homogeneous coverings.

During preparation of the reactive polyurethanes according to the invention, catalysts, e.g., catalysts which are generally known from PU chemistry, which accelerate the reaction of isocyanate groups with compounds which contain active hydrogen, may be used. If a reaction with the isocyanate being used is needed to prepare component III), the catalysts may be used in this reaction. If separate preparation of component I), e.g., to give an NCO prepolymer, is required, they may also be used in this preparation. Likewise, they may be used during the reaction of components I), II) and IV) in the presence of component III). Suitable catalysts include, e.g., tertiary amines (such as, e.g., triethylenediamine), mercury, lead and bismuth catalysts. Tin catalysts such as tin octoate and dibutyltin dilaurate or alkyl esters of diorganotin dimercaptocarboxylic acids are preferred. They are used in amounts of up to 1%, with reference to the total weight of the reaction components.

Preparation of the PU reactive systems according to the invention may be performed, for example, in a "one-shot" process. In this case, components II) and IV) are mixed with component III). Care must be taken (e.g., by controlling temperature and/or addition of catalyst), that the capped or masked NCO groups in component III) do not react prematurely with the hydroxyl components. Subsequently, reaction to give the PU reactive system according to the invention takes place by adding component I), an aliphatic diisocyanate for example. Preferably, components I) and III) as a mixture are mixed with a mixture of components II) and IV) and then reacted.

In another preferred embodiment of the invention, an NCO prepolymer is separately prepared from components I) and II). The separately prepared component III), containing masked NCO groups, is mixed with the melt of the separately prepared NCO prepolymer and the mixture is blended with the requisite amount of component IV).

Alternatively, in another embodiment of the invention, a prepolymer with functional OH groups, e.g. made from component II), optionally with a proportion of short-chain glycols (IV), component III) and/or a proportion of components with functional NCO groups, e.g., diisocyanates (I), are used and are reacted with another diisocyanate or an NCO prepolymer.

Reacting components I) to IV) may take place, for instance, in a stirred apparatus, e.g., by homogenizing the components in the liquid or molten form and then pouring them into blocks, wherein solidification takes place. In order to ensure the most intimate mixing possible, homogenization may be performed in mixing equipment which is well-known to the specialist in the field (e.g., single or twin screw extruders, kneaders, and mix heads such as static mixers or rotor-stator mixers), wherein the liquid or molten reactants are metered through (optionally heated) piping. An after-reaction time is required after the mixing procedure, depending on the type of component mixing used. This varies with the starting materials (e.g., relatively slowly reacting aliphatic isocyanates), the amount of catalyst and the temperature. In general, mixing and after-reaction temperatures should not exceed 110° to 120° C. in order to avoid premature cross-linking via unmasked NCO groups.

It has proven particularly advantageous when processing mixtures of the components, as described above, to use a small excess of groups which react with NCO groups, e.g., OH groups, when preparing the PU reactive systems. This causes a reduction in the viscosity of the molten mixture and facilitates processing at low temperatures.

As already described, the reactive polyurethanes may be used to particular advantage in the powder form, e.g., in the powder-slush molding process. The powder is prepared by subsequent milling, e.g., in impact disc mills, optionally in the presence of the usual auxiliary substances and additives (such as e.g. finely divided silica), and screening of the milled material. In addition, it may possibly be necessary to cool the milled material in order to avoid too great a warming effect due to the shear stress (cooling with e.g., water, solid carbon dioxide or liquid nitrogen).

The milling process is preferably controlled in such a way that powder prepared from the PU systems is produced in the form of pourable particles with diameters between about 10 to 1000 $\mu$. The powder obtained is storage-stable under normal conditions of storage ($<=50°$ C.), despite the low glass transition range of the optionally used polyesters or polycarbonates, due to the extensive pre-lengthening (proportion of urethane and/or urea groups) and the high softening temperature which is conditional on this.

Additives (V), e.g., finely divided particles such as talcs or vapor-phase silicas to improve the flow properties of the powder or melt, may be admixed either during any stage of preparation of the reactive polyurethanes or later to the powder. This also applies to other additives such as e.g., pigments, anti-oxidants, UV stabilizers, auxiliary flow agents, and the like. In a preferred embodiment of the present invention, the additives (V) are added to the starting materials present as a liquid or a melt, thus to components I), II), IV) and/or III) or to the prepolymers prepared therefrom.

Blowing agents, may be added during any stage of the preparation process for the PU reactive systems or to the powders optionally prepared from them. Preferred are powdered blowing agents which are solid at ambient temperature (25° C.) and which are still well below their decomposition point at the mixing and reaction temperatures of the components (e.g., azodicarboxylamides). In this way, optionally powdered PU reactive preparations which contain blowing agent and which may be used for preparing expanded molded items, by heating them to the decomposition temperature of the blowing agent, this being above the PU melting point, are obtained.

Due to their finely divided state, the powders prepared from the reactive polyurethane according to the invention are suitable for a very wide range of painting or coating processes, such as e.g., powder painting or electrostatic gun spraying, as well as for application as hot-melt adhesives.

As is shown by the present invention, the powder may be used to particular advantage in processes in which a molten coating is obtained by sintering the powder in pre-heated sections of molds, being withdrawn as a "skin" after cooling the workpiece. The "slush-molding" process described above is a process of this type. It has been found that the powders according to the invention may be processed even at advantageously low mold temperatures, from about 160° C., by varying the amount and type of starting materials used. The masked NCO groups which react during processing lead to an increase in the viscosity of the melt from the powder. This advantageously means that the melt does not run on overheating or at vertical walls in the mold, as happens with purely thermoplastic and non-cross-linked powders, and that no runs or holes are formed.

This fusion behavior can be adjusted via the proportion of masked NCO groups and/or the NCO index of the powder. The controlled incorporation of masked NCO groups is advantageously simple to manage using previously prepared component III) which can easily be metered in.

The invention is further illustrated but is not intended to be limited by the following examples in which all parts and percentages are by weight unless otherwise specified.

EXAMPLES

Example 1—Prepared Via an NCO Prepolymer 2098.7 parts of a 56 OH number polyester prepared from adipic acid, hexanediol and neopentyl glycol, are melted in a flat glass vessel, blended with 9.3 parts of oxidation protectant mercaptobenzirnidazole (Vulkanox MB, Bayer AG)

6.2 parts of hydrolysis protectant based on carbodiimid (Stabaxol I, Bayer AG)

9.3 parts of UV protectant based on benzotriazole (Tinuvin 328, Ciba-Geigy AG) and 0.6 parts of dibutyltin dilaurate, and dewatered at about 10 mm Hg/100° C. for one hour.

Separately, 171.3 parts of a liquid polyisocyanate which contains uretdione groups and obtained by dimedzing hexaethylene diisocyanate (HDI) (available as Desmodur 3400, Bayer AG) (% NCO=21.4), are reacted with 1-octanol for 2 hours at 90° C. The product (component III) is conveniently fluid to handle when gently heated.

The reaction product of the HDI dimer and octanol, together with 586.5 parts of HDI (component I)), is added to the polyester at 90° C. under nitrogen and the mixture is stirred for about 1 hour to constant NCO content (theoretical 8% NCO, found 7.8%). 600 parts of this NCO pre-polymer are weighed into a vessel and heated, with stirring at 60° C., with 52.2 parts of 1,4-butanediol. The viscosity increases as the temperature rises (max. about 110° C.). The product is cast into 4 mm thick plates and then annealed for 16 hours at 100° C.

The plates which were obtained were granulated and the flow behavior of the material was determined as a function of the pre-heating period. For this, a Göttfert-Feinwerk-Technik HKV 2000 high-pressure capillary viscometer was used at a pressure of 2450 mPa and with a 15 mm long, 1 mm diameter capillary. The decrease in the g/10 min-value as a function of time at 160° C. shows the increase in viscosity due to post-curing of the reactive system (Table 1). Table 1 also shows a thermoplastic system with the same basic formulation, but without a component III), for comparison.

TABLE 1

| | g/10 min. value as a function of time | | | |
|---|---|---|---|---|
| Time [min] → | 5 | 10 | 15 | 20 |
| Example 1 (160° C.) | 356 | 280 | 210 | 173 |
| Thermoplastic comparison (180° C.) | 48.1 | 137 | 196 | 342 |

Example 2—Black Pigmented Reactive Polyurethane, Prepared Via an OH Prepolymer and Isocyanate 41.943 parts of the polyester from example 1 were mixed with 3.410 parts of a polyester of the same type (OH number 50.5) filled with 10% carbon black colorant (Printex V, Degussa) and dewatered as in Example 1.

5,384 parts of 1,4-butanediol, 0.341 parts of oxidation protectant mercaptobenzimidazole (Vulkanox MB, Bayer AG), 0.205parts of UV protectant based on benzotriazole (Tinuvin 328, Ciba-Geigy AG) are then added. The resultant mixture is then reacted at 90° C., with stirring, with 3 parts of HDI and 4.27 parts of the reaction product from the HDI dimer and 1-octanol used in Example 1. A prepolymer with functional OH groups (OH number=110) is obtained with a viscosity of about 1850 mPa.s (rotational viscometer) at 75° C.

To react the OH prepolymer with HDI, the prepolymer (heated to 80° C.) and the isocyanate (at room temperature) are fed from storage vessels into a mix head. In the case of the OH prepolymer, the pipes are heated to 80° C. The OH prepolymer is homogenized with HDI in a weight ratio 6:1 in the mix head (a rotor-stator "pin" mixer, volume 170 ml, speed 1850 rpm) and collected in the receiver in the form of ingots. The exit temperature is about 80° C., with a temperature increase to about 110° C. occurring during the after-reaction stage.

The product is annealed for 16 hours at 100° C. Subsequently, a melting point of about 165° C. is indicated, wherein the melt becomes increasingly solidified (post-curing of the reactive system).

The product ingots are initially split up (plates about 4 cm thick) and then milled to a particle size of ≅300 μm in a commercial cutter/granulator with the addition of solid $CO_2$.

Films are prepared from the powder by spreading the powder in a 2 mm thick layer on metal plates which are at a temperature of about 160° to 170° C. The plates were quickly freed of non-gelled powder by tapping and then annealed for about 10 min. at a 200° C. furnace temperature.

After cooling and releasing from the molds, black pigmented films which are pleasantly soft to the touch are obtained having the following physical characteristics:

| | |
|---|---|
| Strength according to DIN 53 455: | 15 mPa |
| Tensile stretch according to DIN 53 455: | 490% |
| Softening point: | about 170° C. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane with a softening temperature above 80° C. which is NCO-free, which is essentially linear and which is reactive via masked isocyanate groups, comprising the reaction product of
   I) one or more organic diisocyanates of which at least a proportion is symmetric,
   II) one or more essentially linear polyhydroxyl compounds having molecular weights of between 400 and 6000 and glass transition temperatures below 0° C.,
   III) an organic compound having at least a proportion of masked NCO groups, and
   IV) one or more diols having molecular weights of 60 to 600, wherein the ratio of the molecular weight of components II) to the molecular weight of component IV) is at least 3:1,
   wherein
       a) components I), II), III), and IV) are reacted in the molten or liquid form at a temperature below the unmasking temperature of the masked NCO groups,
       b) the amount of masked NCO groups relative to total number of masked and free NCO groups before reaction is between 1 and 20%, and
       c) the ratio of free NCO groups in components I) and III) to the groups which react with NCO groups in components II) and IV) is not more than 1.1:1.

2. The polyurethane of claim 1, wherein 1,4-butanediol is used as component IV).

3. The polyurethane of claim 1, wherein component III) is selected from the group consisting of
   a) a reaction product of the isocyanurate of 1,6-hexamethylene diisocyanate, a hydroxybenzoate and a polyol with an average molar mass of 400 to 6000,
   b) a polyisocyanate which contains uretdione groups or a reaction product of a polyisocyanate which contains uretdione groups and one or more NCO-reactive compounds, and
   c) a mixture thereof.

4. The polyurethane of claim 3, wherein said polyisocyanate which contains uretdione groups is obtained by dimerizing hexamethylene diisocyanate or isophorone diisocyanate.

5. The polyurethane of claim 1, wherein component I) is selected from the group consisting of 1,6-hexamethylene diisocyanate and/or 4,4'-methylene-bis-cyclohexyl diisocyanate, component II) is a polyesterdiol with an average molecular weight of 400 to 6000 and a glass transition temperature below 0° C., and wherein components I) and II) are reacted to form a prepolymer.

6. The polyurethane of claim 1, prepared by reacting
   I) 1,6-hexamethylene diisocyanate, 4,4'-methylene-bis-cyclohexyl diisocyanate, isophorone diisocyanate or a mixture thereof with a mixture of
   II) one or more polyesters polyols having molecular weights of 400 to 6000, and glass transition temperatures below 0° C., and
   IV) one or more diols with molecular weights less than 400, in the presence of component III).

7. The polyurethane of claim 1, prepared by reacting
   I) 1,6-hexamethylene diisocyanate, 4,4'-methylene-bis-cyclohexyl diisocyanate, isophorone diisocyanate or a mixture of thereof with
   II) a prepolymer with functional hydroxyl groups made from one or more of said diisocyanates, said component III) and polyesters with functional hydroxyl groups and molecular weights of 400 to 6000, and glass transition temperatures below 0° C.,
   IV) and one or more diols with molecular weights of less than 400.

8. The polyurethane of claim 1, also containing a blowing agent which is solid at room temperature in an amount of 0.1 to 20% by weight, the decomposition temperature of said blowing agent being higher than the reaction temperature of components I), II), III), and IV).

9. The polyurethane of claim 1 in powdered form, also containing a blowing agent which is solid at room temperature in an amount of 0.1 to 20% by weight, the decomposition temperature of said blowing agent being higher than the reaction temperature of components I), II), III), and IV).

* * * * *